Patented June 18, 1929.

1,718,139

UNITED STATES PATENT OFFICE.

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY PLATE AND PROCESS OF MAKING SAME.

No Drawing.  Application filed December 1, 1921. Serial No. 519,100.

My invention relates to the making of storage battery plates and has to do more particularly with a process having as an object the treatment of a wholly or partially charged battery plate containing finely divided metal whereby appreciable oxidation or self-discharge of said metal, when exposed to either moist or dry air, is prevented or materially retarded.

Another object of my invention is to provide a simple inexpensive and expeditious process for so treating partially or fully charged negative storage battery plates that they can be dried, stored, handled, assembled, transported, and otherwise manipulated without objectionable oxidation or deterioration, so that the battery service station and the user are saved the time, cost and inconvenience incident to giving the long initial charge required by batteries as heretofore made, with negative plates in the oxidized or discharged condition.

A further object of the invention is to provide a potentially active negative battery plate which shall include a substance having the property of arresting or limiting oxidation in air of its metallic active material, but which shall not interfere with the normal working of the plate and shall have no objectionable effect on the battery cell in which said plate is used.

If an ordinary negative battery plate containing charged active material, for instance in the form of spongy lead, be exposed to the atmosphere while in a wet condition, it will automatically oxidize or discharge, with the evolution of heat, by reason of the combination of its moist finely divided metal with the oxygen of the air. In order to preserve such charged negative plates in a potentially active state, I place them in a substance capable of arresting oxidation, in air, of the metallic active material of said plate, or otherwise subject the active material to the action of such substance.

For the purpose noted I have found an aqueous solution of sucrose to give the best results and the negative plates may be dipped or soaked in it directly after their removal from the forming tanks, or, if desired, they may first be washed to remove the residual acid or other electrolyte in which they were formed. The strength of the treating solution and the time of subjecting the plates to its action will depend upon conditions and may vary within wide limits. With lead negative plates such as are used in automobile batteries, I have found a treatment of from one to two hours in 10% sucrose solution, at room temperature, to be very effective. I may prefer, however, to use a stronger solution for a shorter time, or even to coat the wet plates with finely powdered sucrose which will thereafter dissolve in the water or dilute acid on the surface and in the pores of the plates.

After the oxidation-arresting treatment, the plates are preferably rapidly dried by exposure to a moving current of warm air, this drying usually taking from two to four hours. The plates are then in condition to be handled, stored, shipped, etc., and will retain their charge indefinitely without material deterioration.

When desired for use, the plates treated as above described may be placed in service without washing or other preliminary treatment and, when assembled in a cell, will operate to deliver useful electric current without the usual initial charge being given, although in some cases it may be desirable to give a comparatively short freshening charge. Furthermore, such plates will function in the required manner without being in any way injuriously affected by the above described treatment and without objectionable effect of the treating substance on the positive plates or other parts of the cell in which the treated plates are used.

While on account of its economy and convenience I prefer to use sucrose for the charge-preserving treatment herein described, it is to be understood that I may, without departing from my invention, employ other substances having the property of limiting or arresting oxidation in air of the charged active material of negative battery plates. Examples of such other substances are glycerine, commercial glucose, dextrose, lactose, galactose, maltose, fructose, and invert sugar, all of which I have tried and found to have an effect similar to that of sucrose. The word "sugar" is used in the following claims in the broad or inclusive sense.

I claim:

1. The process which consists in treating a negative battery plate, including wet charged active material, with an aqueous solution of an organic substance capable of limiting the oxidation in air of said material; and thereafter rapidly drying said plate.

2. The process which consists in applying an aqueous solution of sugar to a negative battery plate including charged active material, and thereafter rapidly drying said plate.

WILLIAM H. GRIMDITCH.